(12) United States Patent
Kawai et al.

(10) Patent No.: US 7,365,816 B2
(45) Date of Patent: Apr. 29, 2008

(54) LIQUID CRYSTAL DISPLAY

(75) Inventors: Masayuki Kawai, Ibaraki (JP); Shuuji Yano, Ibaraki (JP); Seiji Umemoto, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 330 days.

(21) Appl. No.: 10/560,393

(22) PCT Filed: Mar. 30, 2005

(86) PCT No.: PCT/JP2005/006069

§ 371 (c)(1),
(2), (4) Date: Dec. 13, 2005

(87) PCT Pub. No.: WO2005/116741

PCT Pub. Date: Dec. 8, 2005

(65) Prior Publication Data

US 2006/0170848 A1    Aug. 3, 2006

(30) Foreign Application Priority Data

May 26, 2004   (JP) ............... 2004-156441

(51) Int. Cl.
   *G02F 1/1335*   (2006.01)
(52) U.S. Cl. ..................................... 349/118
(58) Field of Classification Search .............. 349/118
   See application file for complete search history.

(56) References Cited

U.S. PATENT DOCUMENTS 6,115,095 A    9/2000   Suzuki et al.

(Continued)

FOREIGN PATENT DOCUMENTS

JP    11-133408    5/1999

(Continued)

OTHER PUBLICATIONS

Notification of Transmittal of Translation of the International Preliminary Report on Patentability (Form PCT/IB/338) of International Application No. PCT/JP2005/006069 mailed Dec. 25, 2006 with Forms PCT/IB/373; PCT/ISA/237 and PCT/IB/326.

*Primary Examiner*—Brian Healy
*Assistant Examiner*—Guy G Anderson
(74) *Attorney, Agent, or Firm*—Westerman, Hattori, Daniels & Adrian, LLP.

(57) ABSTRACT

A liquid crystal display of the invention comprises an in-plane switching liquid crystal panel containing a liquid crystal layer whose alignment orientation changes according to an electric field in parallel with a surface of a substrate; a first polarizing plate and a second polarizing plate disposed sandwiching the liquid crystal panel therebetween; a first optical film inserted between the first polarizing plate and the liquid crystal panel; and a second optical film inserted between the second polarizing plate and the liquid crystal panel, wherein the first optical film includes: a retardation film A1 having a relation of $nz>nx\geq ny$; and a retardation film B having an in-plane retardation (Re) in the range of from 200 to 300 nm, a relation of $nx>nz>ny$ and satisfying Nz coefficient in the range of $0.3<Nz<0.7$, in which three-dimensional refractive indices are controlled; the second optical film includes a retardation film A2 having a relation of $nz>nx\geq ny$; and the slow axis of the retardation film B is in parallel with or perpendicular to the absorption axes of the first and second polarizing plates. The liquid crystal display has a high contrast ratio over a wide range.

6 Claims, 1 Drawing Sheet

U.S. PATENT DOCUMENTS

| | | | |
|---|---|---|---|
| 6,133,980 A * | 10/2000 | Faris | 349/176 |
| 6,147,734 A * | 11/2000 | Kashima | 349/113 |
| 6,294,231 B1 * | 9/2001 | Kuwabara et al. | 428/1.52 |
| 6,630,973 B1 * | 10/2003 | Matsuoka et al. | 349/117 |
| 2003/0021307 A1 | 1/2003 | Yamazaki | |

FOREIGN PATENT DOCUMENTS

| | | |
|---|---|---|
| JP | 2001-242462 | 9/2001 |
| JP | 2004-4641 | 1/2004 |

* cited by examiner

LIQUID CRYSTAL DISPLAY

TECHNICAL FIELD

This invention relates to an in-plane switching (IPS) type active matrix liquid crystal display.

BACKGROUND ART

An in-plane switching type liquid crystal display presents a pixel display in a way such that an electric field in parallel with a liquid crystal substrate is formed between pixel electrodes and a common electrode. The liquid crystal display of this type has an advantage that a wide viewing angle is obtained as compared with a TN mode type liquid crystal display in which a vertical electric field to a substrate is formed. In conventional in-plane switching type active matrix liquid crystal display, however, an almost perfect black viewing can be achieved in a direction normal to a panel, whereas in a case where the panel is viewed in a direction deviated from the direction normal to the panel, there has been remained a problem that unavoidable light leakage as a characteristic of a polarizing plate occurs in a direction deviated from the optical axis of the polarizing plates disposed on the top or bottom of a liquid crystal cell with the result that a viewing angle is narrowed and a contrast is reduced. In another case where the panel is viewed in a direction oblique relative thereto, an optical path of light is longer, which alters an apparent retardation in a liquid crystal layer. Therefore, when viewed at different viewing angles, a wavelength of transmitted light varies, a color of a screen image changes, thereby causing a color shift depending on an observation direction.

Various kinds of proposals have been offered in order to improve reduction in contrast and a color shift depending on a viewing angle in such conventional in-plane switching type liquid crystal display. For example, a proposal has been offered on a technique that compensation layers each with an optical anisotropy are inserted between a liquid crystal layer and respective polarizing plates in pair sandwiching the liquid crystal layer therebetween (JP-A No. 11-133408). This technique is effective for a color shift, but cannot improve a contrast sufficiently. Another proposal has been offered on a technique that first and second retardation plates are inserted between a liquid crystal layer and respective polarizing plates in pair sandwiching the layer therebetween (JP-A No. 2001-242462). While it is described in the publication that this technique is effective for improvement on reduction in contrast and color shift, a higher improvement effect has been still desired.

DISCLOSURE OF INVENTION

It is an object of the invention to provide an in-plane switching type active matrix liquid crystal display using an optical film obtained by laminating a polarizing plate and a retardation film and having a high contrast ratio over a wide range.

The inventors have been conducted serious studies in order to solve the problem with the result that a liquid crystal display shown below has been discovered, which has led to the invention.

That is, the invention related to a liquid crystal display comprising: an in-plane switching liquid crystal panel containing a liquid crystal layer whose alignment orientation changes according to an electric field in parallel with a surface of a substrate; a first polarizing plate and a second polarizing plate disposed sandwiching the liquid crystal panel therebetween; a first optical film inserted between the first polarizing plate and the liquid crystal panel; and a second optical film inserted between the second polarizing plate and the liquid crystal panel, wherein the first optical film includes: a retardation film A1 having a relation of nz>nx≧ny; and a retardation film B having in-plane retardation (Re) in the range of from 200 to 300 nm, a relation of nx>nz>ny and satisfying Nz coefficient in the range of 0.3<Nz<0.7, in which three-dimensional refractive indices are controlled;

the second optical film includes a retardation film A2 having a relation of nz>nx≧ny; and the slow axis of the retardation film B is in parallel with or perpendicular to the absorption axes of the first and second polarizing plates.

Providing that, in each of the films, the direction along with the in-plane refractive index in the film plane is maximized is defined as the X axis, the direction perpendicular to the X axis is defined as the Y axis, the direction of the thickness of the film is defined by the Z axis, and refractive indices in each axial directions at 590 nm are defined as nx, ny and nz, respectively, and the thickness of the film is defined as d (nm), the in-plane retardation (Re) and Nz are given by the following equations:

$$\text{in-plane retardation (Re)}=(nx-ny)\times d \text{ and}$$

$$Nz=(nx-nz)/(nx-ny).$$

In the liquid crystal display of the invention, the first optical film including the retardation film A1 and the retardation film B is disposed on one side of the liquid crystal panel and the optical film including the retardation film A2 is disposed on the other side of the liquid crystal panel, thereby enabling light leakage in black viewing in active matrix liquid crystal display, which has been conventionally occurred, to be reduced. Such the liquid crystal display can suppress reduction in contrast due to an axial change caused by a change in viewing angle between polarizers disposed in the crossed-Nichols positional relation, has a high contrast ratio across all the directions and enables a display to be easily viewed over a wide viewing angle. Besides, the technique can suppress a color shift.

The retardation film A1 and the retardation film A2 each have a relation of nz>nx≧ny. Control of retardation in the thickness direction can be achieved with the retardation film A1 and the retardation film A2, thereby enabling reduction in contrast when viewed in an oblique direction to be suppressed.

The retardation film B can cancel light leakage in a direction deviated from the optical axis in a case where a polarizing plate is disposed in the cross-Nichols positional relation with the specific retardation and is preferably adopted in IPS mode liquid crystal display. The retardation film B especially has a function compensating reduction in contrast in an oblique direction relative to a liquid crystal layer. The retardation film B is laminated so that the absorption axis of the polarizing plate and the slow axis of the retardation film are perpendicular to or in parallel with each other.

The retardation film B has the in-plane retardation (Re) in the range of from 200 to 300 nm and the Nz value in the range of 0.3<Nz<0.7. The in-plane retardation (Re) is preferably 240 nm or more and more preferably 260 nm or more in order to raise compensation function. On the other hand, preferable is 290 nm or less and more preferable is 280 nm or less. The Nz value is preferably 0.4 or more and more preferably 0.45 or more in order to raise a compensation function. On the other hand, the Nz value is preferably 0.6 or less and more preferably 0.55 or less.

In the above liquid crystal display, preferably, the first polarizing plate and the second polarizing plate each have a protective film on both surfaces of a polarizer, retardation in the thickness direction ($Rth_1$) of the protective film applied on the liquid crystal panel side of the first polarizing plate and retardation in the thickness direction ($Rth_2$) of the retardation film A1 satisfy the following relation: $0 \leq ||Rth_1|-|Rth_2|| \leq 15$ nm, and retardation in the thickness direction ($Rth_3$) of a protective film applied on the liquid crystal panel side of the second polarizing plate and retardation in the thickness direction ($Rth_4$) of the retardation film A2 satisfy the following relation: $0 \leq ||Rth_3|-|Rth_4|| \leq 15$ nm.

Providing that, in each of the films, the direction along with the in-plane refractive index in the film plane is maximized is defined as the X axis, the direction perpendicular to the X axis is defined as the Y axis, the direction of the thickness of the film is defined by the Z axis, and refractive indices in each axial directions at 590 nm are defined as nx, ny and nz, respectively, and the thickness of the film is defined as d (nm), the retardation in the thickness direction (Rth) is given by the following equation:

retardationinth in the thickness direction (Rth)=$nx-nz \times d$.

In a case where the protective film of the polarizing plate, especially the protective film applied on the liquid crystal panel side has positive retardation in the thickness direction (Rth), a viewing angle is narrowed due to birefringence. On the other hand, since the retardation film A1 and the retardation film A2 each have a relation of nz>nx≧ny, retardations in the thickness direction ($Rth_2$) and ($Rth_4$) thereof have negative values. Birefringence due to the positive retardation in the thickness direction that the protective film used for the polarizing plate has can be compensated by negative retardations in the thickness direction which the retardation film A1 and the retardation film A2 have. Therefore, a difference in absolute value between the retardations in the thickness direction ($Rth_1$) and ($Rth_3$) of the protective films applied on the liquid crystal panel sides of the first and second polarizing plates, and the retardations in the thickness direction ($Rth_2$) and ($Rth_4$) of the retardation film A1 and the retardation film A2 is adjusted to be 10 mm or less, thereby enabling a viewing angle better in contrast to be obtained. A smaller difference in absolute value therebetween is preferable and a difference in absolute value therebetween is preferably 5 nm or less and most preferably 0 nm.

Retardation in the thickness direction ($Rth_2$) of the retardation film A1 and retardation in the thickness direction ($Rth_4$) of the retardation film A2 each are preferably in the range of from −10 to −150 nm.

Retardations in the thickness direction ($Rth_2$) and ($Rth_4$) are preferably in the range of from −30 to −100 nm and more preferably in the range of from −30 to −70 nm from a viewpoint of contrast in a wide viewing angle. The usage of the retardation film A1 and the retardation film A2 with the same retardation in the thickness direction (Rth) is preferable in that a good contrast can be obtained over a wide viewing angle.

Note that in a case where protective films applied on the liquid crystal panel side of polarizing plates with retardations in the thickness direction ($Rth_1$) and ($Rth_3$) are in the range of from +30 to +100 nm, preferably +30 to +70 nm, respectively, it is preferable to use the retardation film A1 and the retardation film A2 with the retardations in the thickness direction ($Rth_2$) and ($Rth_4$) in order to reduce a difference in absolute value between retardations in the thickness direction (Rth) of protective films and retardation films A1 and A2.

No specific limitation is imposed on the in-plane retardation (Re) of the protective film, but it is preferably 10 nm or less and more preferably 6 nm or less. No specific limitation is imposed on a thickness d of the protective film, but it is generally 500 μm or less and preferably in the range of from 1 to 300 μm. Especially preferable is in the range of 5 to 200 μm.

Films each formed with a layer including a liquid crystal polymer fixed in homeotropic alignment can be preferably used as the retardation film A1 and/or the retardation film A2.

In the above liquid crystal display, preferably, the first polarizing plate and the second polarizing plate each have a protective film on both surfaces of a polarizer, the slow axis of the protective film applied on the liquid crystal panel side of the first polarizing plate and the absorption axis of the first polarizing plate are in parallel with or perpendicular to each other, and the slow axis of the protective film applied on the liquid crystal panel side of the second polarizing plate and the absorption axis of the second polarizing plate are in parallel with or perpendicular to each other.

In the above liquid crystal display, also, the first optical film is preferably obtaining by laminating the retardation film A1 and the retardation film B in the order from the first polarizing plate side from a viewpoint of contrast over a wide viewing angle.

In Figs., reference marks represent following:
P1: polarizing plate,
P2: polarizing plate,
a: polarizer,
b b': protective films,
A1: retardation film having relation of nz>nx≧ny,
A2: retardation film having relation of nz>nx≧ny,
B: retardation film whose three-dimensional refractive indices are controlled

BEST MODE FOR CARRYING OUT THE INVENTION

Figure 1A:
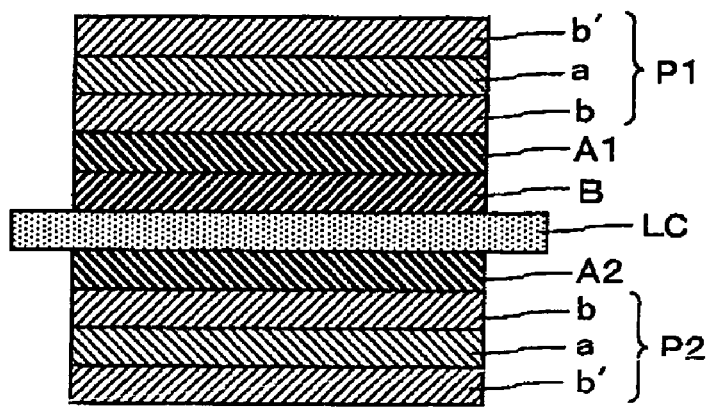
FIG. 1(a) is an example of sectional view of IPS mode liquid crystal display of the invention.

Description will be given of in-plane switching (IPS) type active matrix liquid crystal display of the invention below with reference to the accompanying drawing. FIG. 1(a) is an example of sectional view of a liquid crystal display of the invention and FIG. 1(b) is a conceptual diagram indicating axial directions of respective films.

Figure 1B:
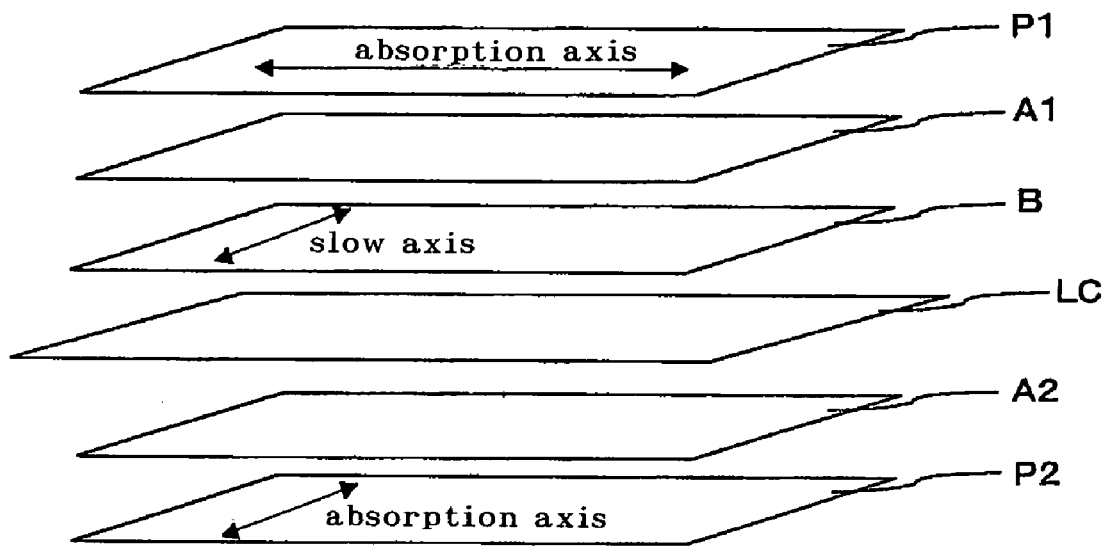
FIG. 1(b) is an example of conceptual diagram indicating axial directions of respective films used in the IPS mode liquid crystal display of the invention.

As shown in FIGS. 1(a) and 1(b), an in-plane switching liquid crystal panel LC and a first polarizing plate P1 and a second polarizing plate P2 are disposed so as to sandwich the liquid crystal panel LC therebetween. The polarizing plate P1 and the polarizing plate P2 are disposed so that the absorption axes of thereof are perpendicular to each other, as shown in FIG. 1(b). A retardation film A1 having a relation of nz>nx≧ny and a retardation film B whose three dimensional refractive indices having a relation of nx>nz>ny are controlled are disposed, which are in the order from the polarizing plate P1, between the polarizing plate P1 and the liquid crystal panel LC. On the other hand, the retardation film A2 having a relation of nz>nx≧ny is disposed between the polarizing plate P2 and the liquid crystal panel LC.

In FIGS. 1(a) and 1(b), the retardation film A1 and the retardation film B are disposed in the order from the polarizing plate P1 side, while to the contrary, the retardation film B and the retardation film A1 can also be disposed in the order from the polarizing plate P1 side. It is preferable to dispose the retardation film A1 and the retardation film B in the order from the polarizing plate P1 side since a good contrast is assured over a wide viewing angle.

In addition, in FIG. 1(b), the retardation film B is disposed so that the slow axis thereof is perpendicular to the absorption axis of the polarizing plate P1 and parallel with the absorption axis of the polarizing plate 2, while another configuration can also be allowed in which the slow axis of the retardation film B is in parallel with the absorption axis of the polarizing plate P1, and perpendicular to the absorption axis of the polarizing plate P2. It is preferable to dispose the retardation film B as in FIG. 1(b) since a good contrast is obtained over a wide viewing angle.

The polarizing plate P1 and the polarizing plate P2 each, usually, have, as shown in FIG. 1(a), protective films b and b' on both surface of a polarizer a.

In addition, it is preferable, since a good contrast is obtained over a wide viewing angle, to make a configuration in which the slow axis of the protective film b applied on the liquid crystal panel side of the polarizing plate P1 is in parallel with or perpendicular to the absorption axis of the polarizing plate P1 and the slow axis of the protective film b applied on the liquid crystal panel side of the polarizing plate P2 is in parallel with or perpendicular to the absorption axis of the polarizing plate A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type orientation films, such as dehydrated polyvinyl alcohol and dehydrochlorinated polyvinyl chloride, etc. may be mentioned. In these, a polyvinyl alcohol type film on which dichromatic materials such as iodine is absorbed is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As the protective film prepared on the polarizer, materials is excellent in transparency, mechanical strength, heat stability, water shielding property, isotropy, etc. may be preferably used. As mentioned above, the retardation in the thickness direction (Rth) of the protective film is preferable in the range of from +30 to +100 nm.

Examples of materials forming such a protective film include: for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; arylate type polymers; polyoxymethylene type polymers; epoxy type polymers; or blend polymers of the above-mentioned polymers may be mentioned. The protective film may be formed with a cured layer made of resins of heat curing type or ultraviolet curing type, such as acrylics type, urethane type, acrylics urethane type and epoxy type and silicone type. As a material of the protective film, preferable is triacetyl cellulose generally used as the protective film for the polarizer.

As the opposite side of the polarizing-adhering surface above-mentioned protective film, a film with a hard coat layer and various processing aiming for antireflection, sticking prevention and diffusion or anti glare may be used.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight parts to the transparent resin 100 weight parts that forms the fine concavo-convex structure on the surface, and preferably 5 to 25 weight parts. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective layer.

Isocyanate based adhesives, polyvinyl alcohol based adhesives, gelatin based adhesives, vinyl based latex based, aqueous polyester based adhesives, and etc. may be used for adhesion processing for the above-mentioned polarizers and the protective films.

No specific limitation is imposed on the retardation films A1 and A2 as far as the films have a relation of nz>nx≧ny, and a homeotropic aligned liquid crystal layer obtained by fixing a liquid crystal polymer in homeotropic alignment is preferably adopted.

The homeotropic aligned liquid crystal layer is obtained by aligning a liquid crystal material, for example, with a vertical alignment agent. For example, a nematic liquid crystal compound has been known as a liquid crystal compound that can be homeotropic aligned. A general statement concerning such an alignment technique of the liquid crystal compound is given in, for example, "Kagaku Sosetsu 44 (surface modification, edited by The Chemical Society of Japan, pp. 156 to 163).

Liquid crystal materials of the homeotropic aligned liquid crystal layer may be mentioned, for example, a side-chain type liquid crystal polymer including a monomer unit (a) containing a liquid crystalline fragment side chain and having positive refractive index anisotropy. In addition, the liquid crystal material can be formed with a side chain type liquid crystal polymer including the monomer unit (a) and a monomer unit (b) containing a non-liquid crystalline fragment side chain. The latter side chain type liquid crystal polymer can realize a homeotropic alignment of the liquid crystal polymer even without using a vertical alignment film. Description will be given of the liquid crystal polymer or the like below.

The above-mentioned monomer unit (a) has a side chain with nematic liquid crystalline, for example, a monomer unit represented by the following general formula (1) may be mentioned.

[Chemical formula 1]

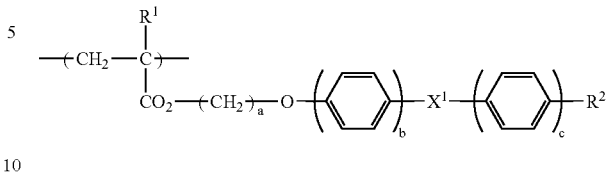

where, $R^1$ is a hydrogen atom or a methyl group, a is a positive integer of 1 to 6, $X^1$ is —$CO_2$— group or —OCO— group, $R^2$ is a cyano group, an alkoxy group with 1 to 6 carbon, fluoro group or alkyl group with 1 to 6 carbon, and b and c are integers of 1 or 2 respectively.

Moreover, as a monomer unit (b) has a linear side chain, for example, a monomer unit represented by the following general formula (2) may be mentioned.

[Chemical formula 2]

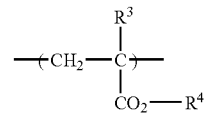

where, $R^3$ is a hydrogen atom or a methyl group, $R^4$ is an alkyl group with 1 to 22 carbon, a fluoroalkyl group with 1 to 22 carbon, or a monomer unit represented by the general formula (3):

[Chemical formula 3]

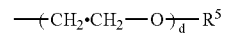

where, d is a positive integer of 1 to 6, and $R^5$ is an alkyl group with 1 to 6 carbon.

Besides, the ratio of the monomer unit (a) and the monomer unit (b) is not limited in particular. Although the ratio varies also according to the kinds of monomer units, since the side chain type liquid crystal polymer does not show liquid crystal monodomain alignment property when the ratio of the monomer unit (b) increases, the percentage is preferably defined in a range of (b)/{(a)+(b)}=0.01 to 0.8 (mole ratio), more preferably 0.1 to 0.5.

As the liquid crystal polymer that can form the homeotropic aligned liquid crystal film, the side chain type liquid crystal polymer comprising the monomer unit (a) including a liquid crystalline fragment side chain and a monomer unit (c) including liquid crystalline fragment side chain having an alicyclic cyclic structure may be mentioned.

The monomer unit (c) has a side chain exhibiting a nematic liquid crystallinity, and, for example, such a monomer unit may be mentioned that is represented with a general formula (4):

[Chemical formula 4]

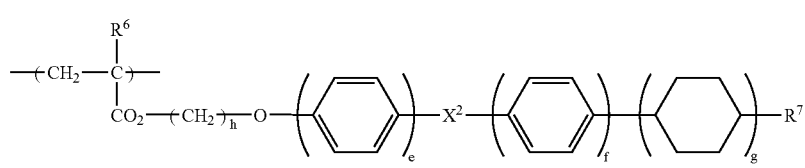

where, $R^6$ represents a hydrogen atom or a methyl group, h represents a positive integer of 1 to 6, $X^2$ represents a —$CO_2$— group or a —OCO-group, e and g represent integers of 1 or 2, f represents an integer of 0 to 2, and $R^7$ represents a cyano group and an alkyl group having a carbon number of 1 to 12.

In addition, a ratio of the monomer unit (a) and the monomer unit (c) is not especially limited, and may also be varied depending on kinds of the monomer units. Since the side chain type liquid crystal polymer tends to show less liquid crystal mono-domain alignment property as a percentage of the monomer unit (c) increases, preferably (c)/{(a)+(c)}=0.01 to 0.8 (mole ratio). Especially it is more preferably 0.1 to 0.6.

Liquid crystal polymers that can form the homeotropic aligned liquid crystal layer are not limited to the illustrated examples having the monomer units, and more than one of the illustrated monomer units may be appropriately combined.

A weight average molecular weight of the above-mentioned side chain type liquid crystal polymer is preferably in a range of 2000 to 100000. Performance as a liquid crystal polymer is demonstrated by adjusting the weight average molecular weight into this range. The weight average molecular weight is preferably 2500 or more, because the film forming property of an alignment layer shows a tendency of being poor when the weight average molecular weight of the side chain type liquid crystal polymer is too small. On the other hand, the weight average molecular weight is preferably 50000 or less because if the weight average molecular weight is too large the polymer has a tendency of forming a poor alignment state caused by a poor alignment property as liquid crystal.

Moreover, the above-illustrated side chain type liquid crystal polymer can be prepared by copolymerization of acrylic based monomers or methacrylic based monomers corresponding to the monomer unit (a), the monomer unit (b), and the monomer unit (c). And monomers corresponding to the monomer unit (a), the monomer unit (b), and the monomer unit (c) may be synthesized by well-known methods. Preparation of the copolymer may be performed according to, for example, conventional polymerization methods for acrylic based monomers, such as radical polymerization methods, cationic polymerization methods, and anion polymerization methods etc. In addition, when a radical polymerization method is used, various kinds of polymerization initiators may be used, and especially, polymerization initiators, such as azobis-iso-butyronitril, benzoyl peroxide, etc. may preferably be used that has medium, not excessively high nor excessively low, decomposition temperatures.

Photopolymerizable liquid crystalline compound may be blended to the side chain type liquid crystal polymer to obtain liquid crystalline composition. The photopolymerizable liquid crystalline compound is a liquid crystalline compound that has at least one unsaturated double bond, such as acryloyl groups or methacryloyl groups, as a photopolymerizable functional group, of which nematic liquid crystalline compound is preferably used. As the photopolymerizable liquid crystalline compounds, acrylates and methacrylates that copolymerizable with the monomer unit (a) may be illustrated. In order to improve durability, compounds that have two or more photopolymerizable functional groups are preferable as the photopolymerizable liquid crystalline compounds. As such photopolymerizable liquid crystalline compounds, cross link-type nematic liquid crystal monomer represented with a following general formula(5) may be illustrated:

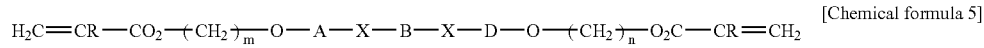

[Chemical formula 5]

where, R represents a hydrogen atom or a methyl group; A and D represent independently a 1,4-phenylene group or a 1,4-cyclo hexylene group, respectively; X independently represents a —COO-group, a —OCO-group, or a —O-group, respectively; B represents a 1,4-phenylene group, a 1,4-cyclo hexylene group, a 4,4'-biphenylene group, or a 4,4'-bicyclo hexylene group; and m and n independently represent integers of 2 to 6, respectively. Moreover, as photopolymerizable liquid crystalline compounds, there may be mentioned: compounds whose terminal "$H_2C=CR-CO_2-$" in the general formula (d) is substituted by a vinyl ether group or an epoxy group, and compounds whose "—$(CH_2)_m$—" and/or "—$(CH_2)_n$—" is substituted by "—$(CH_2)_3$—$C^*H(CH_3)$—$(CH_2)_2$—" or "—$(CH_2)_2$—$C^*H(CH_3)$—$(CH_2)_3$—.

The above-mentioned photopolymerizable liquid crystalline compound gives liquid crystal state by heat treatment, which may show, for example, a nematic liquid crystal layer, and provide homeotropic alignment together with the side chain type liquid crystal polymer. And subsequently the photopolymerizable liquid crystalline compound is polymerized or cross-linked to improve durability of the homeotropic aligned liquid crystal film.

A ratio of the photopolymerizable liquid crystalline compound and the side chain type liquid crystal polymer in the liquid crystalline composition is not especially limited, and appropriately determined in consideration of durability of the homeotropic aligned liquid crystal film to be obtained. Usually, preferably, by weight ratio, (photopolymerizable liquid crystalline compound):(side chain type liquid crystal polymer)=0.1:1 to 30:1, more preferably 0.5:1 to 20:1, and still more preferably 1:1 to 10:1.

The liquid crystalline composition usually includes a photopolymerization initiator. As photopolymerization initiators, various kinds of initiators may be used without any limitation. As photopolymerization initiators, for example, Irgacure 907, for example, Irgacure 184, Irgacure 651, Irgacure 369, etc. by Ciba Specialty Chemicals may be illustrated. In consideration of kinds of the photopolymerizable liquid crystal compounds, compounding ratios of the liquid crystalline composition, etc., the amount of the photo polymerization initiator is added that does not disturb homeotropic alignment of the liquid crystalline composition. Usually, the amount is preferably about 0.5 to 30 parts by weight base on 100 parts by weight of the photopolymerizable liquid crystalline compound, and especially preferably 3 parts or more by weight.

Production of the homeotropic aligned liquid crystal film is performed by a following method: the homeotropic side chain type liquid crystal polymer is coated on a substrate, subsequently, the side chain type liquid crystal polymer is spontaneously aligned in a liquid crystal state, and then the aligned liquid crystal is fixed in a state that the alignment state is maintained. Moreover, a following method is adopted when using a homeotropic liquid crystalline composition comprising the side chain type liquid crystal polymer and the photopolymerizable liquid crystalline compound: the homeotropic liquid crystalline composition is coated on a substrate; subsequently, the liquid crystalline composition is spontaneously aligned in a liquid crystal state; then the aligned liquid crystal is fixed in a state that the alignment state is maintained, and then is light irradiated.

Substrates that the side chain type liquid crystal polymer or the liquid crystalline composition coat may have any shape of glass substrates, metallic foils, plastic sheets, or plastic films. Any kinds of plastic films may be used without special limitation as long as they are not affected nor give any variation by temperatures at which alignment is conducted. For example, there may be mentioned films formed of transparent polymers: polyester based polymers, such as polyethylene terephthalate and polyethylene naphthalene's; cellulose based polymers, such as diacetyl celluloses and triacetyl celluloses; polycarbonate based polymers; and acrylic polymers, such as poly methylmethacrylates etc. The substrate does not necessarily require a vertical alignment film provided thereon. Thickness of the substrate is usually about 10 to 1000 µm.

As methods for coating the side chain type liquid crystal polymer or the liquid crystalline composition onto a substrate, a solution coating method using a solution comprising the side chain type liquid crystal polymer or the liquid crystalline composition dissolved in a solvent, or a melt-coating method for coating the molten liquid crystal polymer or the molten liquid crystalline composition may be mentioned. Among them, the solution coating method for coating the solution of the side chain type liquid crystal polymer or the liquid crystalline composition on the supporting substrate is preferable.

As methods for coating the solution of the side chain type liquid crystal polymer or the liquid crystalline composition, which is adjusted to a desired concentration using the above-mentioned solvents, to the anchor coat layer on the substrate, for example, a roll coating method, a photogravure coating method, a spin coating method, a bar coating method, etc. may be used. The solvent is removed after coating and a liquid crystal polymer layer or a liquid crystalline composition layer is formed on the substrate. Conditions for removal of the solvent are not especially limited as long as most of the solvent is removed, or the liquid crystal polymer layer or the liquid crystalline composition layer do not flow around nor flow down. Usually, the solvent is removed using methods, such as drying at room temperatures, drying in a drying furnace, and heating on a hot plate. Among the coating methods, it is preferable in the invention to adopt a photogravure coating method because of easiness of uniform coating over a large area.

Subsequently, the side chain type liquid crystal polymer layer or the liquid crystalline composition layer formed on a supporting substrate is made in a liquid crystal state and is spontaneously aligned. For example, heat treatment is performed so as to give the side chain type liquid crystal polymer or the liquid crystalline composition within a liquid crystal temperature range, and they are homeotropically aligned in liquid crystal state. The heat treatment method may be performed by the same method as the above-mentioned drying methods. The heat treatment temperature is varied depending on the kinds of the side chain type liquid crystal polymers or the liquid crystalline compositions, and supporting substrates to be used, and usually, but not limited to, is in a range of 60 to 300° C., and preferably in a range of 70 to 200° C. Moreover, the heat treatment period of time is varied depending on the heat treatment temperature, and the kinds of the side chain type liquid crystal polymers or the liquid crystalline compositions and kinds of substrates to be used, and usually, but not limited to, is in a range of 10 seconds to 2 hours, and preferably of 20 seconds to 30 minutes. When a heat treatment period of time is shorter than 10 seconds, there is a possibility that formation of homeotropic alignment may not adequately advance. Of the alignment temperatures and alignment times, it is preferable in the invention to conduct at an alignment temperature in the range of from 80 to 150° C. for an alignment time of the order in the range of from 30 sec to 10 min from the standpoints of workability and mass production.

Cooling operation is performed after the heat treatment. Displacing the homeotropic aligned liquid crystal film after heat treatment into a room temperature atmosphere from a heating atmosphere during the heat treatment operation may perform cooling operation. Forced cooling, such as by air cooling and by water cooling, may be performed. By cooling not more than a glass transition temperature of the side chain type liquid crystal polymer, alignment of the homeotropically aligned layer of the side chain type liquid crystal polymer is fixed. For the liquid crystalline composition, by irradiating the fixed homeotropic aligned liquid crystal layer, the photopolymerizable liquid crystalline compound is polymerized or cross-linked to fix the photopolymerizable liquid crystalline compound, resulting in a homeotropic aligned liquid crystal layer having improved durability. Light irradiation is, for example, UV irradiation. In order to promote the reaction adequately, UV irradiation conditions are preferably in inert gas atmosphere. Usually, a high pressure mercury ultraviolet lamp having illumination of approximately 80 to 160 mW/cm$^2$ is typically used. Lamps of another kind, such as meta-halide UV lamp and incandescent tube, may also be used. Moreover, adjustment of temperatures is adequately performed by cooling treatments by cold mirror, water cooling, and others or by increase in line velocities so as to give a temperature of the liquid crystal layer surface upon UV irradiation in a liquid crystal temperature range.

Thus, a thin film of the side chain type liquid crystal polymer or the liquid crystalline composition is formed, and then is fixed, while alignment is being maintained, and thus aligned liquid crystal layer having homeotropic alignment is obtained.

No specific limitation is placed on the thickness of the homeotropic aligned liquid crystal film, but the thickness of the homeotropic aligned liquid crystal film layer formed of the coated side chain type liquid crystal polymer is preferably in the range of around 0.5 to 200 µm. The homeotropic aligned layer can be used either by peeling off from a substrate or without peeling off from a substrate.

As the retardation film B, in which Nz coefficient is in the range of 0.3<Nz<0.7 and in-plane retardation (Re) is in the range of from 200 to 300 nm is employed. Examples of the retardation films include: a birefringent film made from a polymer film; an alignment film made from a liquid crystal polymer and others.

Among polymers are, for example: polycarbonate; polyolefins, such as and polypropylene; polyesters, such as polyethylene terephthalate and polyethylenenaphthalate; cycloaliphatic polyolefins, such as poly norbornene etc.; polyvinyl alcohols; polyvinyl butyrals; polymethyl vinyl ethers; poly hydroxyethyl acrylates; hydroxyethyl celluloses; hydroxypropyl celluloses; methylcelluloses; polyarylates; polysulfones; polyether sulfones; polyphenylene sulfides; polyphenylene oxides; poly aryl sulfones; polyvinyl alcohols; polyamides; polyimides; polyvinyl chlorides; cellulose based polymers; or various kinds of binary copolymers; ternary copolymers; and graft copolymers of the above-mentioned polymers; or their blended materials. A retardation film may be obtained by adjusting a refractive index in a thickness direction using a method in which a polymer film is biaxially stretched in a planar direction, or a method in which a high polymer film is uniaxially or biaxially stretched in a planar direction, and also stretched in a thickness direction etc. And a retardation film may be obtained using, for example, a method in which a heat shrinking film is adhered to a polymer film, and then the combined film is stretched and/or shrunken under a condition of being influenced by a shrinking force to obtain tilted orientation.

As liquid crystalline polymers, for example, various kinds of principal chain type or side chain type polymers may be mentioned in which conjugated linear atomic groups (mesogen) demonstrating liquid crystal alignment property are introduced into a principal chain and a side chain of the polymer. As illustrative examples of principal chain type liquid crystalline polymers, for example, nematic orientated polyester based liquid crystalline polymers having a structure where mesogenic group is bonded by a spacer section giving flexibility, discotic polymers, and cholesteric polymers, etc. may be mentioned. As illustrative examples of side chain type liquid crystalline polymers, there may be mentioned a polymer having polysiloxanes, polyacrylates, polymethacrylates, or poly malonates as a principal chain skeleton, and having a mesogen section including a para-substituted cyclic compound unit giving nematic orientation through a spacer section comprising conjugated atomic group as side chain. As preferable examples of oriented films obtained from these liquid crystalline polymers, there may be mentioned a film whose surface of a thin film made of polyimide or polyvinyl alcohol etc. formed on a glass plate is treated by rubbing, and a film obtained in a method that a solution of a liquid crystalline polymer is applied on an oriented surface of a film having silicon oxide layer vapor-deposited by an oblique vapor deposition method and subsequently the film is heat-treated to give orientation of the liquid crystal polymer, and among them, a film given tilted orientation is especially preferable.

A laminating method for the above-mentioned retardation films and polarizing plates is not especially limited, and lamination may be carried out using pressure sensitive adhesive layers etc. As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

In addition, ultraviolet absorbing property may be given to the above-mentioned each layer, such as an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

An in-plane switching type active matrix liquid crystal display of the invention, as shown in FIG. 1, has an in-plane switching liquid crystal panel LC having a liquid crystal layer whose alignment orientation changes according to an electric field in parallel with a surface of a substrate. The display has a backlight on one side. The backlight is provided on the light incidence side, which is not shown in the figure. In FIG. 1, the backlight can be installed either on the side on which the polarizing plate P1 is disposed or on the side on which the polarizing plate P2 is disposed, but it is preferably to install the backlight on the side on which the polarizing plate P2 of FIG. 1 is disposed.

A liquid crystal panel has a liquid crystal cell comprising: a pair of substrates sandwiching a liquid crystal layer; a group of electrodes formed on one of the above-mentioned pair of substrates; a liquid crystal composition material layer having dielectric anisotropy sandwiched between the above-mentioned substrates; an orientation controlling layer that is formed on each of surfaces, facing each other, of the above-mentioned pair of substrates in order to orient molecules of the above-mentioned liquid crystal composition material in a predetermined direction, and driving means for applying driver voltage to the above-mentioned group of electrodes. The above-mentioned group of electrodes has alignment structure arranged so that parallel electric field may mainly be applied to an interface to the above-mentioned orientation controlling layer and the above-mentioned liquid crystal composition material layer.

EXAMPLES

Description will be given of the invention with examples in a concrete manner, but it should be understood that the invention is not limited to the examples.

In-plane retardation (Re) and retardation in the thickness direction (Rth) were measured with an automatic birefringence measuring device (automatic birefringence meter KOBRA21ADH manufactured by Oji Sceientific Instruments.) at a wavelength of 590 nm. Nz coefficient was calculated on the retardation film B. In measurement of an optical retardation, measurement lights entered to a sample surface in a direction normal or oblique relative to the sample surface. A homeotropic alignment can be confirmed from the fact that with increase in incidence angle of measurement light, retardation is raised.

Example 1

(Retardation Films A1 and A2)

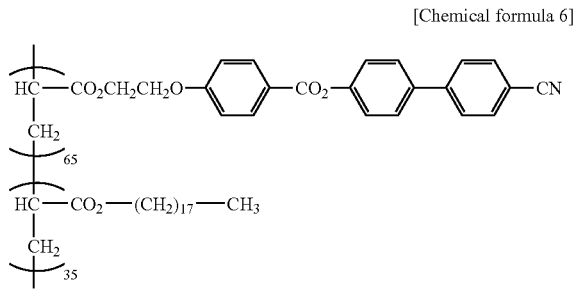

[Chemical formula 6]

Dissolved into 75 parts by weight of cyclohexanone were 5 pats by weight of a side chain type liquid crystal polymer expressed by the chemical formula 6 (wherein numerals each indicate a molar percentage of a monomer unit, and which is exhibited by a block polymer unit for convenience, and a weight average molecular weight was 5000); 20 parts by weight of a polymerizable liquid crystal showing a nematic liquid crystal phase (Paliocolor LC242, manufactured by BASF LTD.) and 3 parts by weight of a photoinitiator (IRGACURE 907 manufactured by Ciba Specialty Chemicals Co.) to polymerizable liquid crystal to thereby prepare a solution. The solution was coated on a stretched base film (ZEONOR film manufactured by Nippon Zeon Co., Ltd.) to thickness of 0.6 μm with a bar coater, the wet coat was dried at 100° C. for 10 min, the dry coat is illuminated with UV and cured to thereby obtain a homeotropic aligned liquid crystal layer. The homeotropic aligned liquid crystal layer had in-plane retardation (Re) of almost zero and retardation in the thickness direction $(Rth_{2, 4})=-60$ nm.

(Retardation Film B)

A heat-shrinkable film was adhered on both surfaces of a polycarbonate film with a pressure sensitive adhesive layer interposed therebetween, thereafter the composite film was uniaxially stretched to a ratio of 1.3 at 152° C. to thereby obtain a stretched film. The obtained stretched film had in-plane retardation (Re) of 270 nm and Nz coefficient of 0.50.

(Polarizing Plate Attached with Retardation Film Adhered Thereon on the Viewing Side)

The retardation film A1 and the retardation film B are adhered to each other with a pressure sensitive adhesive of 21 μm in thickness interposed therebetween in roll to roll and thereafter, the ZEONOA film was peeled off. A polarizing plate (SEG1224DU manufactured by NITTO DENKO CORPORATION.) was adhered to the side of the retardation film A1 with a pressure sensitive adhesive of 21 μm in thickness interposed therebetween to thereby obtain a polarizing plate attached with a retardation film as a single piece of a laminate. The polarizing plate attached with the retardation film was used on the viewing side.

The polarizing plate was obtained in a procedure in which a protective film is laminated on both surfaces of a film obtained by adsorbing iodine to a polyvinyl alcohol-based film to stretch the film (polarizer with thickness of 20 μm) with an adhesive. Used as the protective film was a triacetyl cellulose film having in-plane retardation (Re) of 4 nm and retardation in the thickness direction $(Rth_{1,3})$ of +60 nm. The polarizer and the protective film are laminated so that absorption axis of the polarizer and the slow axis of the protective film are in parallel with each other. A difference in absolute value between retardation in the thickness direction $(Rth_1)$ of the protective film and retardation in the thickness direction $(Rth_3)$ of the retardation film A1 (a homeotropic liquid crystal layer) is 0 nm. The absorption axis of the polarizing plate and the slow axis of the retardation film B are disposed so as to be perpendicular to each other.

(Polarizing Plate Attached with Retardation Film Adhered Thereon on the Backlight Side)

The retardation film A2 (the retardation film A1 and retardation film A2 are the same as each other in Example 1) and a polarizing plate (SEG1224DU manufactured by NITTO DENKO CORPORATION) were adhered to each other with an pressure sensitive adhesive of 21 μm in thickness to obtain a polarizing plate attached with a retardation film as a single piece of a laminate. The polarizing plate attached with the retardation film thereon was used on the backlight side.

The polarizer and the protective film are laminated so that the absorption axis of the polarizer and the slow axis of the protective film are in parallel with each other. A difference in absolute value between retardation in the thickness direction $(Rth_3)$ of the protective film and retardation in the thickness direction $(Rth_4)$ of the retardation film A2 (homeotropic liquid crystal layer) are 0 nm.

(Liquid Crystal Display).

A liquid crystal display was obtained by disposing the polarizing plate attached with the retardation film thereon so that the polarizing plate thereof faces the liquid crystal panel side as shown in FIG. 1, both surfaces of the IPS mode liquid crystal panel wherein the top side is set as the viewing side and the bottom side is set as the backlight side. A configuration was adopted in which the slow axis of the retardation film B and the absorption axis of the polarizing plate on the top side are perpendicular to each other and the absorption axes of the polarizing plates of the top side and bottom side are perpendicular to each other.

Example 2

(Retardation Film A1)

A homeotropic aligned liquid crystal layer was obtained in a similar way to that in Example 1 with the exception that in Example 1, coating was applied to thickness of 0.5 μm. The homeotropic aligned liquid crystal layer had in-plane retardation (Re) of almost zero and retardation in the thickness direction $(Rth_2)$ of −50 nm.

(Retardation Film B)

A stretched film was obtained in a similar way to that in Example 1 with the exception that in Example 1, a stretch ratio is changed to 1.28. The obtained stretched film had in-plane retardation (Re) of 255 nm and Nz coefficient of 0.54.

(Polarizing Plate Attached with a Retardation Film Thereon on the Viewing Side)

A polarizing plate-attached with a retardation film was obtained in a similar way to that in Example 1 with the exception that in Example 1, the retardation film A1 and retardation film B, both having been obtained above, are used. The polarizing plate attached with the retardation film thereon was used on the viewing side. A difference in absolute value between retardation in the thickness direction ($Rth_1$) of the protective film and retardation in the thickness direction ($Rth_2$) of the retardation film A1 (homeotropic liquid crystal layer) is 10 nm.

(Retardation Film A2)

A homeotropic aligned liquid crystal layer was obtained in a similar way to that in Example 1 with the exception that in Example 1, coating was applied to thickness of 0.7 μm. The homeotropic aligned liquid crystal layer had in-plane retardation (Re) of almost zero and retardation in the thickness direction ($Rth_4$) of −70 nm.

(Polarizing plate Attached with a Retardation Film Thereon on the Backlight Side)

A polarizing plate attached with a retardation film was obtained in a similar way to that in Example 1 with the exception that in Example 1, the retardation film A2 that has been obtained above was used. The polarizing plate attached with the retardation film thereon was used on the backlight side. A difference in absolute value between retardation in the thickness direction ($Rth_3$) of the protective film and retardation in the thickness direction ($Rth_4$) of the retardation film A2 (homeotropic liquid crystal layer) is 10 nm.

(Liquid Crystal Display)

A liquid crystal display was obtained in a similar way to that in Example 1 with the exception that in Example 1, the polarizing plates attached with the retardation film thereon, both having been fabricated above were used on the viewing side and the backlight side.

Example 3

(Retardation Film A1)

A homeotropic aligned liquid crystal layer was obtained in a similar way to that in Example 1 with the exception that in Example 1, coating was applied to thickness of 0.7 μm. The homeotropic aligned liquid crystal layer had in-plane retardation (Re) of almost zero and retardation in the thickness direction ($Rth_2$) of −70 nm.

(Retardation Film B)

A stretched film was obtained in a similar way to that in Example 1 with the exception that in Example 1, a stretch ratio is changed to 1.32. The obtained stretched film had in-plane retardation (Re) of 290 nm and Nz coefficient of 0.45.

(Polarizing Plate Attached with a Retardation Film Thereon on the Viewing Side)

A polarizing plate attached with a retardation film was obtained in a similar way to that in Example 1 with the exception that in Example 1, the retardation film A1 and retardation film B, both having been obtained above, are used. The polarizing plate attached with the retardation film thereon was used on the viewing side. A difference in absolute value between retardation in the thickness direction ($Rth_1$) of the protective film and retardation in the thickness direction ($Rth_2$) of the retardation film A1 (homeotropic liquid crystal layer) is 10 nm.

(Retardation Film A2)

A homeotropic aligned liquid crystal layer was obtained in a similar way to that in Example 1 with the exception that in Example 1, coating was applied to thickness of 0.5 μm. The homeotropic aligned liquid crystal layer had in-plane retardation (Re) of almost zero and retardation in the thickness direction ($Rth_4$) of −50 nm.

(Polarizing plate Attached with a Retardation Film Thereon on the Backlight Side)

A polarizing plate attached with a retardation film was obtained in a similar way to that in Example 1 with the exception that in Example 1, the retardation film A2 that has been obtained above was used. The polarizing plate attached with the retardation film thereon was used on the backlight side. A difference in absolute value between retardation in the thickness direction ($Rth_3$) of the protective film and retardation in the thickness direction ($Rth_4$) of the retardation film A2 (homeotropic liquid crystal layer) is 10 nm.

(Liquid Crystal Display)

A liquid crystal display was obtained in a similar way to that in Example 1 with the exception that in Example 1, the polarizing plates attached with the retardation film thereon, both having been fabricated above were used on the viewing side and the backlight side.

Comparative Example 1

(Retardation Film A1)

A homeotropic aligned liquid crystal layer was obtained in a similar way to that in Example 1 with the exception that in Example 1, coating was applied to thickness of 3.0 μm. The homeotropic aligned liquid crystal layer had in-plane retardation (Re) of almost zero and retardation in the thickness direction ($Rth_2$) of −300 nm.

(Retardation Film B)

A stretched film was obtained in a similar way to that in Example 1 with the exception that in Example 1, a stretch ratio is changed to 1.45 and stretching temperature is changed to 45° C. The obtained stretched film had in-plane retardation (Re) of 440 nm and Nz coefficient of 0.78.

(Polarizing Plate Attached with a Retardation Film Thereon on the Viewing Side)

A polarizing plate attached with a retardation film was obtained in a similar way to that in Example 1 with the exception that in Example 1, the retardation film A1 and retardation film B, both having been obtained above, are used. The polarizing plate attached with the retardation film thereon was used on the viewing side. A difference in absolute value between retardation in the thickness direction ($Rth_1$) of the protective film and retardation in the thickness direction ($Rth_2$) of the retardation film A1 (homeotropic liquid crystal layer) is 240 nm.

(Retardation Film A2)

A homeotropic aligned liquid crystal layer was obtained in a similar way to that in Example 1 with the exception that in Example 1, coating was applied to thickness of 3.0 μm. The homeotropic aligned liquid crystal layer had in-plane retardation (Re) of almost zero and retardation in the thickness direction ($Rth_4$) of −300 nm.

(Polarizing Plate Attached with a Retardation Film Thereon on the Backlight Side)

A polarizing plate attached with a retardation film was obtained in a similar way to that in Example 1 with the exception that in Example 1, the retardation film A2 that has been obtained above was used. The polarizing plate attached with the retardation film thereon was used on the backlight side. A difference in absolute value between retardation in the thickness direction ($Rth_3$) of the protective film and retardation in the thickness direction ($Rth_4$) of the retardation film A2 (homeotropic liquid crystal layer) is 240 nm.

(Liquid Crystal Display)

A liquid crystal display was obtained in a similar way to that in Example 1 with the exception that in Example 1, the polarizing plates attached with the retardation film thereon, both having been fabricated above were used on the viewing side and the backlight side.

Comparative Example 2

(Liquid Crystal Display)

The polarizing plates that had been used in Example 1 were disposed on both surfaces of the IPS mode liquid crystal panel that had been used in Example 1 so that the absorption axes thereof were perpendicular to each other to obtain a liquid crystal display.

(Evaluation)

A viewing angle in which a contrast ratio (Co)≧10 was obtained was measured, in each of the liquid crystal displays obtained in Examples and Comparative Examples, using EZ contrast 160D manufactured by ELDIM Co., observed from a direction, upper and lower side, left and right side, at 45 degrees and −225 degrees as diagonal and 135 degrees and −315 degrees as diagonal. In Table 1, there are shown results of the measurement.

TABLE 1

| | Viewing angles |
|---|---|
| Example 1 | 70° |
| Example 2 | 65° |
| Example 3 | 65° |
| Comparative Example 1 | 20° |
| Comparative Example 2 | 20° |

INDUSTRIAL APPLICABILITY

An in-plane switching type active matrix liquid crystal display of the invention has a high contrast ratio over a wide range.

The invention claimed is:

1. A liquid crystal display comprising: an in-plane switching liquid crystal panel containing a liquid crystal layer whose alignment orientation changes according to an electric field in parallel with a surface of a substrate; a first polarizing plate and a second polarizing plate disposed sandwiching the liquid crystal panel therebetween; a first optical film inserted between the first polarizing plate and the liquid crystal panel; and a second optical film inserted between the second polarizing plate and the liquid crystal panel, wherein the first optical film includes: a retardation film A1 having a relation of $nz>nx\geq ny$; and a retardation film B having in-plane retardation (Re) in the range of from 200 to 300 nm, a relation of $nx>nz>ny$ and satisfying Nz coefficient in the range of $0.3<Nz<0.7$, in which three-dimensional refractive indices are controlled;

the second optical film includes a retardation film A2 having a relation of $nz>nx\geq ny$; and the slow axis of the retardation film B is in parallel with or perpendicular to the absorption axes of the first and second polarizing plates, where, in each of the films, the direction along with the in-plane refractive index in the film plane is maximized is defined as the X axis, the direction perpendicular to the X axis is defined as the Y axis, the direction of the thickness of the film is defined by the Z axis, and refractive indices in each axial directions at 590 nm are defined as nx, ny and nz, respectively, and the thickness of the film is defined as d (nm), the in-plane retardation (Re) and Nz are given by the following equations:

in-plane retardation (Re)=$(nx-ny)\times d$ and $Nz=(nx-nz)/(nx-ny)$.

2. The liquid crystal display according to claim 1, wherein the first polarizing plate and the second polarizing plate each have a protective film on both surfaces of a polarizer, retardation in the thickness direction ($Rth_1$) of the protective film applied on the liquid crystal panel side of the first polarizing plate and retardation in the thickness direction ($Rth_2$) of the retardation film A1 satisfy the following relation: $0\leq \||Rth_1|-|Rth_2|\|\leq 15$ nm, and retardation in the thickness direction ($Rth^3$) of a protective film applied on the liquid crystal panel side of the second polarizing plate and retardation in the thickness direction ($Rth^4$) of the retardation film A2 satisfy the following relation: $0\leq \||Rth_3|-|Rth_4|\|\leq 15$ nm, where, in each of the films, the direction along with the in-plane refractive index in the film plane is maximized is defined as the X axis, the direction perpendicular to the X axis is defined as the Y axis, the direction of the thickness of the film is defined by the Z axis, and refractive indices in each axial directions at 590 nm are defined as nx, ny and nz, respectively, and the thickness of the film is defined as d (nm), the retardation in the thickness direction (Rth) is given by the following equation:

retardation in the thickness direction (Rth)=$(nx-nz)\times d$.

3. The liquid crystal display according to claim 1, wherein the retardation in the thickness direction ($Rth^2$) of the retardation film A1 and the retardation in the thickness direction ($Rth^4$) of the retardation film A2 each are in the range of from −10 to −150 nm.

4. The liquid crystal display according to claim 1, wherein the retardation film A1 and/or the retardation film A2 include a liquid crystal polymer fixed in homeotropic alignment.

5. The liquid crystal display according to claim 1, wherein the first polarizing plate and the second polarizing plate each have a protective film on both surfaces of a polarizer, the slow axis of the protective film applied on the liquid crystal panel side of the first polarizing plate and the absorption axis of the first polarizing plate are in parallel with or perpendicular to each other, and the slow axis of the protective film applied on the liquid crystal panel side of the second polarizing plate and the absorption axis of the second polarizing plate are in parallel with or perpendicular to each other.

6. The liquid crystal display according to any of claims 1 to 5, wherein the first optical film is laminate of the retardation film A1 and the retardation film B in the order from the first polarizing plate side.

* * * * *